United States Patent
Onderko et al.

(10) Patent No.: US 7,523,796 B2
(45) Date of Patent: Apr. 28, 2009

(54) OVERRIDE CONTROL CIRCUIT FOR A LAWN AND GARDEN TRACTOR

(75) Inventors: Joseph M. Onderko, Copley, OH (US); Michael W. Miller, Brunswick, OH (US); Scott C. Bly, Olmstead Falls, OH (US)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 10/590,166

(22) PCT Filed: Feb. 16, 2005

(86) PCT No.: PCT/US2005/004782

§ 371 (c)(1),
(2), (4) Date: Sep. 24, 2007

(87) PCT Pub. No.: WO2005/081826

PCT Pub. Date: Sep. 9, 2005

(65) Prior Publication Data

US 2008/0135313 A1    Jun. 12, 2008

Related U.S. Application Data

(60) Provisional application No. 60/549,519, filed on Mar. 2, 2004, provisional application No. 60/546,156, filed on Feb. 20, 2004.

(51) Int. Cl.
*B60K 25/08* (2006.01)
(52) U.S. Cl. .................. 180/53.6; 180/53.1; 307/326
(58) Field of Classification Search ............... 180/53.6, 180/271, 272, 273, 274, 53.61, 53.62, 53.8, 180/53.1; 307/328, 326; 318/282; 56/10.2 R, 56/10.8; 172/74, 79, 83
See application file for complete search history.

(56) References Cited

U.S. PATENT DOCUMENTS

| 3,229,452 | A | 1/1966 | Hasenbank |
| 3,999,643 | A | 12/1976 | Jones |
| 5,203,440 | A | 4/1993 | Peterson, Jr. et al. |
| 5,314,038 | A | 5/1994 | Peterson, Jr. |
| 5,616,964 | A | 4/1997 | Peterson, Jr. |
| 5,994,857 | A | 11/1999 | Peterson, Jr. et al. |
| 6,026,634 | A | 2/2000 | Peter et al. |
| 6,109,010 | A | 8/2000 | Heal et al. |

(Continued)

FOREIGN PATENT DOCUMENTS

EP    1 389 556 A1    2/2004

*Primary Examiner*—Árpád Fábián-Kovács
(74) *Attorney, Agent, or Firm*—Wegman, Hessler & Vanderburg

(57) ABSTRACT

Control circuits for a riding lawn mower. The control circuits provide an override condition for selectively allowing the cutting blades of the lawn mower to operate when the vehicle is traveling in reverse. The circuits incorporate an ignition switch (8), an override switch (80), a vehicle reverse switch (40), and an operator presence switch (12). In one aspect of the invention, the control circuits disable the engine when the vehicle is placed in reverse with the PTO engaged and without the override condition having been established. In another aspect of the invention, an electric PTO clutch (60) is disabled when the vehicle is placed in reverse with the PTO engaged and without the override condition having been established. The override condition is terminated when the vehicle is turned off, or when the operator deactivates the manual override switch.

9 Claims, 2 Drawing Sheets

U.S. PATENT DOCUMENTS

| | | |
|---|---|---|
| 6,237,311 B1 | 5/2001 | Richards |
| 6,316,891 B1 | 11/2001 | Hough |
| 6,405,513 B1 | 6/2002 | Hancock et al. |
| 6,437,458 B1 | 8/2002 | Baggett |
| 6,513,310 B1 | 2/2003 | Hancock et al. |
| 6,568,162 B2 | 5/2003 | Walters |
| 6,591,594 B2 | 7/2003 | Hancock et al. |
| 6,720,679 B2 | 4/2004 | Harada et al. |
| 6,758,292 B2 * | 7/2004 | Shoemaker ............... 180/53.6 |
| 7,128,177 B2 * | 10/2006 | Harvey et al. ............. 180/53.6 |
| 7,131,509 B2 * | 11/2006 | Harvey et al. ............. 180/53.6 |
| 2003/0056480 A1 | 3/2003 | Johnson |
| 2004/0026138 A1 | 2/2004 | Shoemaker |
| 2004/0026150 A1 | 2/2004 | Nishi et al. |
| 2004/0124026 A1 | 7/2004 | Walters et al. |
| 2004/0201286 A1 | 10/2004 | Harvey et al. |

* cited by examiner

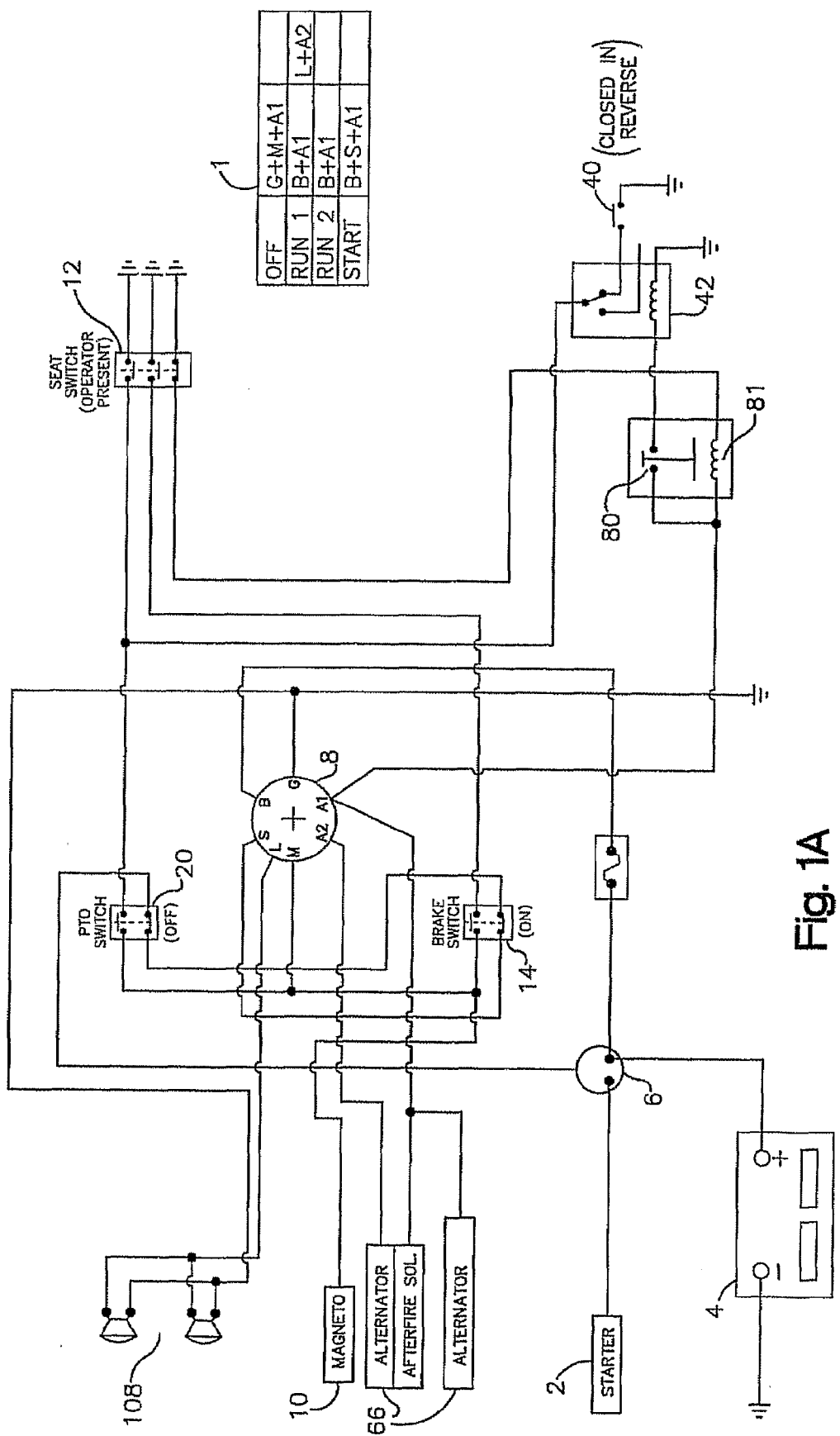

OVERRIDE CONTROL CIRCUIT FOR A LAWN AND GARDEN TRACTOR

CROSS REFERENCE TO RELATED APPLICATIONS

This application claims the priority benefit of U.S. Provisional Patent Application Ser. No. 60/546,156 filed Feb. 20, 2004 and 60/549,519 filed Mar. 2, 2004.

BACKGROUND OF THE INVENTION

1. Field of Invention

The present invention relates generally to electrical control circuits for a lawn and garden tractor or similar vehicle having a controllable power-take-off (PTO) system, and more particularly relates to an override system for establishing an override condition whereby the operator may operate the PTO while the vehicle is traveling in reverse.

2. Description of Related Art

Lawn tractors, mowing machines, and similar vehicles such as snow blowers, sweepers, and leaf blowers having PTO driven attachments are well known. Such machines generally include a magneto operated internal combustion (IC) engine for driving the machine and a controllable power-take-off (PTO) for transferring power to an attachment or implement, such as the cutting unit of a lawn and garden tractor.

Under certain conditions, it is desirable to operate the PTO while the vehicle is traveling in reverse. Various override systems have been proposed for this purpose, but many are inconvenient and difficult to operate. Providing an override system that is convenient, safe, reliable, and relatively simple to incorporate into existing engine control circuitry has been heretofore difficult to achieve.

SUMMARY OF THE INVENTION

Override control circuits adapted for use with a riding lawn mowing vehicle having a conventional magneto operated internal combustion (IC) engine. The control circuits are adapted to provide an override condition for selectively allowing the PTO (and associated cutting blades) of the vehicle to operate when the vehicle is traveling in reverse. The control circuits are responsive to input from a key actuated ignition switch, a manually activated override switch, a vehicle reverse switch, and a power-take-off (PTO) switch. In one aspect of the invention, if the vehicle is placed in reverse with the PTO switch engaged and without the override condition having been established, the engine of the vehicle will become disabled. In another aspect of the invention, the control circuit is adapted to disable an electric PTO clutch if the vehicle is placed in reverse with the PTO engaged and without the override condition having been established. In each of the exemplary embodiments, once the override condition is established, the override condition is maintained when the vehicle transitions between reverse and forward operation direction. This means the vehicle can be repeatedly shifted back and forth between forward and reverse without interrupting the override condition. The override condition is also maintained if the operator transitions the PTO between an engaged and disengaged condition subsequent to the override condition having been established.

These and other objects, features, and advantages of the present invention will become apparent to one skilled in the art upon examination and analysis of the following detailed description in view of the drawings.

BRIEF DESCRIPTION OF THE DRAWINGS

FIG. 1A is a circuit schematic illustrating a manual PTO override circuit in accordance with an embodiment of the present invention;

DETAILED DESCRIPTION OF EXEMPLARY EMBODIMENTS

Figure 1B:
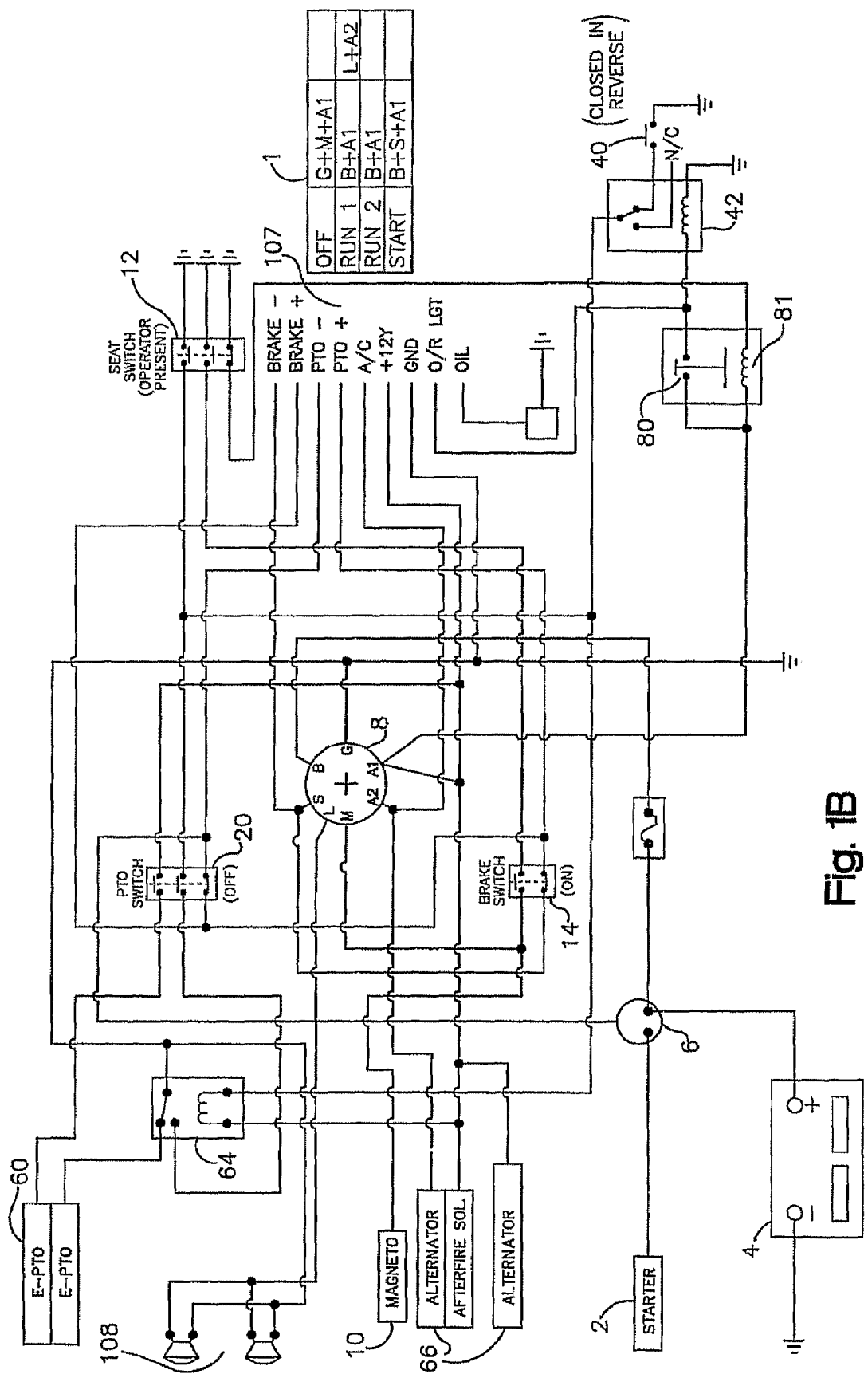
FIG. 1B is a circuit schematic illustrating an electric PTO override circuit in accordance with an alternative embodiment of the present invention.

With reference to the drawings, FIGS. 1A and 1B depict a pair of override control circuits in accordance with exemplary embodiments of the present invention. Each circuit is comprised of readily available components. Although the circuits are similar is many respects, important differences between the circuits are noted where such differences are important for understanding the scope of the present invention.

As described in more detail below, both circuits are adapted to provide an override condition for allowing PTO operation when the vehicle is operating in a reverse direction. The circuit of FIG. 1A is referred to as a "manual PTO" circuit because it is adapted to kill the engine (and subsequently disable the PTO) if reverse operation is selected when the PTO switch 20 is engaged and without the override condition having been established. By comparison, the circuit of FIG. 1B is referred to as an "electric PTO" circuit because it is adapted to disable an electric PTO clutch 60 (and subsequently disable the PTO) if reverse operation is selected when the PTO switch 20 is engaged and without the override condition having been established.

As shown in FIGS. 1A and 1B, both circuits include a two-position PTO switch 20. The PTO switch 20 is shown in the off position. The PTO switch 20 allows the operator to selectively activate and deactivate the vehicle power-take-off (PTO) so as to control the associated implements, i.e., the cutting blades (not shown), via the PTO switch 20. In the manual PTO circuit of FIG. 1A, the PTO switch 20 is in the form of a two-pole switch, whereas in the electric PTO circuit of FIG. 1B, the PTO switch 20 is in the form of a three-pole switch, wherein the middle pole is connected to a second general purpose relay 64 for controlling the electric PTO clutch 60. Both circuits incorporate a reverse switch 40 for selectively operating the vehicle in a reverse or forward direction, and a first general purpose relay 42 operatively associated between the PTO switch 20 and reverse switch 40.

As mentioned above, the override control circuits of FIGS. 1A, 1B are adapted for use with a riding lawn mowing vehicle having a conventional magneto operated internal combustion engine (not shown). Both circuits incorporate a multi-position key actuated ignition switch 8 having an input terminal B connected to a source of electrical power, such as battery 4. In the present embodiments, the ignition switch 8 includes an OFF position, a RUN1 position, a RUN2 position, and a START position.

With reference to table 1 in FIGS. 1A and 1B, it is apparent that when the ignition switch 8 is in the OFF position, contact is made between ignition switch terminals G (ground), M (magneto), and A1 (power). When the ignition switch 8 is in the START position, contact is made between ignition switch terminals B (battery), S (starter), and A1. When the ignition switch 8 is in the RUN1 position, contact is made between ignition switch terminals B (battery) and A1 (power), and between terminals L (lights) and A2 (power). In the present embodiments, terminals L and A2 are used to power a set of headlights 108. When the ignition switch is in the RUN2 position, contact is made between ignition switch terminals B (battery) and A1 (power). As will be discussed in more detail below, the override condition of the present invention is predicated on the ignition switch 8 being placed in either the RUN1 or RUN2 position. However, it is understood that many different ignition switch configurations could be used to achieve the same results.

Referring again to FIGS. 1A and 1B, when ignition switch 8 is placed in the OFF position, a complete circuit is provided via ignition switch terminals M and G, thereby connecting the magneto 10 to ground and preventing the engine from operating. When ignition switch 8 is moved to the START position, a complete circuit is provided between starter unit 2 and battery 4 (assuming brake switch 14 is ON and PTO switch 20 is OFF), thereby energizing solenoid 6 via battery 4 so as to actuate starter 2 and start the engine. Once the engine has been started, ignition switch 8 is adapted to move to either the RUN1 or RUN2 position. If the operator should leave the operator seat when the engine is running and the brake switch 14 is OFF, seat switch 12 will create an uninterrupted current path between the magneto 10 and ground (via the upper pole of brake switch 14), thereby killing the engine.

With continued reference to FIGS. 1A and 1B, the circuits include an override switch 80 for selectively activating the override condition. In the present embodiments, the override switch 80 comprises a manually operated twist-and-pull magnetic switch operatively associated with an electromagnetic coil 81. The override switch 80 and electromagnetic coil 81 are connected to ignition switch terminal A1. In this way, the electromagnetic coil 81 is continuously energized via terminal A1 whenever the ignition switch 8 is placed in the RUN1 or RUN2 position. Assuming the engine has been started and the ignition switch 8 has been placed in the RUN1 or RUN2 position, the override condition may be achieved once the operator physically activates the override switch 80.

Once the operator has manually activated override switch 80, an electromagnetic force induced by electromagnetic coil 81 (assuming coil 81 is energized by terminal A1) is of sufficient magnitude to sustain the override switch 80 in the activated (i.e., closed) position. In the present embodiments, it is to be noted that although the electromagnetic force from the electromagnetic coil 81 is sufficient to sustain the override switch 80 in the activated position once the override switch has been manually (i.e., physically) activated by the operator, it is not of sufficient magnitude to activate or trigger the override switch by itself. Rather, the override switch is initially triggered by a physical input (i.e., twist and pull) from the operator. However, it is also understood that many other arrangements and/or combinations of switches, including, but not limited to, digital flip-flops, may be used to achieve the same results.

When the override switch 80 is closed, first relay 42 is activated via closed override switch 80. Once first relay 42 is activated, reverse switch 40 is isolated from PTO switch 20, allowing the operator to repeatedly open and close the reverse switch 40 without interrupting the continuous operation of the PTO. Since the override switch 80 is sustained in the closed position by the energized electromagnetic coil 81, there is no requirement for the operator to actuate the override condition each time the vehicle is put into reverse to facilitate mowing in reverse. In this way, once the override switch is engaged and the override condition is achieved, the vehicle can be repeatedly shifted back and forth through FORWARD and REVERSE positions without interrupting or re-setting the override condition. Accordingly, once the override switch 80 is activated and the override condition is achieved, the vehicle can be placed in reverse with the PTO ON without having to reactivate the override switch 80 each time the vehicle is placed in reverse. If during operation the operator should decide to disable the override condition, the operator may disengage the override switch 80 and return to the non-override mode of operation.

With continuing reference to FIGS. 1A and 1B, the override condition of the present invention is independent of the status of the PTO switch 20. This means that once the override switch 80 is activated, the operator can repeatedly cycle the PTO switch 20 between the ON and OFF positions without affecting or interrupting the override condition. In this way, additional operator convenience is provided because if the operator desires to temporarily turn the PTO OFF after the override condition has been established, PTO operation can be subsequently restored by turning the PTO switch ON, without having to re-set or reactivate the override condition.

As discussed above, if the operator desires to operate the PTO while the vehicle is traveling in reverse, the operator must first activate the override switch 80 before reverse operation is selected. As shown in FIG. 1A, if the PTO switch 20 and reverse switch 40 are ON, and if first relay 42 is deactivated (i.e. override switch 80 is open as shown), an uninterrupted current path is provided between the magneto 10 and ground via PTO switch 20, first relay 42 and reverse switch 40, thereby killing the engine and subsequently disabling the PTO. However, if first relay 42 is activated (i.e. the override switch 80 is closed), then the reverse switch 40 is isolated from the PTO switch 20, with results being that the magneto 10 is not grounded via the reverse switch 40 when reverse operation is selected.

Unlike the manual PTO circuit of FIG. 1A, the electric PTO circuit of FIG. 1B includes a second general purpose relay 64 and associated electric PTO clutch 60. As shown in FIG. 1B, if the PTO switch 20 and reverse switch 40 are ON, and if first relay 42 is deactivated (as shown), then a closed path is provided between battery 4 and ground, allowing a flow of current to energize second relay 64, with results being that power to the electric PTO clutch 60 is interrupted, thereby disabling the PTO.

In the electric PTO circuit of FIG. 1B, should the operator fail to activate the override switch 80 prior to placing the vehicle in reverse with the PTO engaged, an uninterrupted current path from the alternator/afterfire solenoid 66 to ground via second relay 64 and reverse switch 40 will activate second relay 64, thereby interrupting the power circuit for electric PTO clutch 60 and subsequently disabling the PTO. However, similar to the manual PTO circuit of FIG. 1A, if the operator activates the override switch 80 (thus activating relay 42) prior to closing the reverse switch 40, second relay 64 will be isolated from the reverse switch 40, with results being that second relay 64 will be isolated from ground and PTO operation will be maintained.

With continued reference to FIG. 1B, should the operator fail to activate the override switch 80 before the reverse switch 40 is closed (assuming the PTO switch 20 is ON), second relay 64 will be activated, thereby interrupting the power circuit for electric PTO clutch 60 and subsequently disabling the PTO. Under these circumstances, assuming the PTO switch 20 remains ON and the reverse switch 40 remains closed, second relay 64 will remain energized even if the operator subsequently activates the override switch 80. Second relay 64 will remain energized due to a self-feeding current circulating between the alternator/afterfire solenoid 66 and ground via relay 64 (coil), the closed middle pole of PTO switch 20, and the activated terminals of relay 64. In order to deactivate second relay 64 and thus restore PTO operation, the operator must first turn the PTO switch OFF so as to open the middle pole of PTO switch 20 and interrupt the self-feeding current path. Once this is accomplished and the self-feeding current has been interrupted (thereby deactivating relay 64), PTO operation may be re-established when the operator re-engages the PTO switch 20, assuming the override switch 80 remains closed as the vehicle is traveling in reverse. The foregoing feature improves operator safety by requiring the operator to intentionally toggle the PTO switch off and then on again if PTO operation is desired when reverse operation is selected prior to the override switch having been activated.

In operation, if the operator desires to release the override condition, the operator may manually de-activate the override switch 80 by physically returning the override switch 80 to its original (i.e., open) position. This means that the operator must supply sufficient manual or physical force on the override switch (for example by pushing or pulling the twist-and-pull switch) to overcome the sustaining magnetic force induced on the switch from the electromagnetic coil 81. Once this is achieved, the override switch (which may, for example, be spring loaded) returns to its default (i.e. open) position, thereby interrupting the flow of current to first relay 42 and thus releasing the override condition.

As shown in FIGS. 1A and 1B, suppose the operator leaves the operator seat when the override switch 80 is activated. An open circuit at seat switch 12 interrupts the current path through the electromagnetic coil 81, thereby releasing the override switch 80. Once the override switch 80 is released, first relay 42 is deactivated, thus disabling the override condition. Although the operator seat switch 12 is employed to release the override condition, many other switching means could also be used to release the override condition, such means being well-known in the art. For example, the override condition is also released if the operator turns the ignition switch 8 to the OFF position. When the ignition switch 8 is OFF, the electromagnetic coil 81 is deactivated, thereby releasing the magnetic override switch 80 and thus disabling the override condition.

By allowing the operator to control the override condition with a single override switch 80, the system provides considerable operator convenience and improved operator safety, allowing the operator to disable the override system at any time during mowing operations. Moreover, a single override switch allows the operator to maintain at least one hand on the vehicle's steering control while also controlling the override system.

As shown in FIG. 1B, the electric PTO circuit further includes an array of electrical leads 107 which may be connected in a manner known in the art to a series of dashboard lights or monitors to notify the operator of the operational status of the respective components as shown, thereby further improving operator convenience.

In each of the control circuits of the present invention, there is no requirement for the operator to actuate the override condition each time the vehicle is put into reverse to facilitate mowing in reverse. Rather, once the override switch 80 is engaged and the override condition is achieved, the vehicle can be repeatedly shifted back and forth between forward and reverse direction without disabling the PTO or interrupting the override condition. In the exemplary control circuits of FIGS. 1A and 1B, the override condition is independent of the status of the PTO switch 20. This means that once the override switch 80 is activated, the operator can repeatedly cycle the PTO switch 20 between the ON and OFF positions without affecting or interrupting the override condition. In other words, the override condition is maintained even if the operator desires to temporarily turn the PTO OFF (for example, when crossing a road or driveway). PTO operation can be subsequently restored by simply turning the PTO switch ON, without having to re-set or reactivate the override condition.

In the foregoing specification, the invention has been described with reference to specific exemplary embodiments thereof. It will, however, be evident that various modifications and changes may be made thereunto without departing from the broader spirit and scope of the invention therein. Although the present invention has been illustrated with discrete electrical components, it may also be implemented with integrated circuits, for example digital flip-flops, microcontrollers, and/or other software-based control systems. It is understood that even though numerous characteristics and advantages of the present invention have been disclosed, other modifications and alterations are within the knowledge of those skilled in the art and are to be included within the scope of the appended claims.

What is claimed is:

1. A control circuit for controlling a power-take-off of an engine driven lawn and garden vehicle, said control circuit comprising:
    a multi-position ignition switch having at least an off position and a run position;
    a PTO switch having an engaged position and a disengaged position for selectively engaging and disengaging said power-take-off;
    a reverse switch having a forward position and a reverse position for selectively operating said vehicle in a forward or a reverse direction;
    an override switch having an activation position and a non-activation position;
    said control circuit providing a non-override condition when said ignition switch is in said run position and said override switch is in said non-activation position, said non-override condition preventing operation of said power-take-off when said vehicle is operating in said reverse direction;
    said control circuit providing an override condition when said ignition switch is in said run position and said override switch is in said activation position, said override condition allowing operation of said power-take-off when said vehicle is operating in said reverse direction;
    wherein said override condition is maintained when said vehicle transitions between said reverse and forward directions, and when said PTO switch transitions between said engaged and disengaged positions; and
    wherein said override condition is released when said ignition switch is in said off position, or when said override switch is in said non-activation position.

2. The control circuit as recited in claim 1, wherein said vehicle includes an electric PTO clutch connected to said PTO switch, said PTO clutch being responsive to said PTO switch for selectively engaging and disengaging said power-take-off.

3. The control circuit as recited in claim 2, further comprising means for disengaging said electric PTO clutch when said PTO switch is in said engaged position and said override switch is activated subsequent to said reverse switch being placed in said reverse position, said PTO clutch being re-engaged once said PTO switch has been switched from said engaged position to said disengaged position and then back to said engaged position.

4. The control circuit as recited in claim 1, wherein said engine includes a magneto connected to said PTO switch and said reverse switch, said magneto being grounded so as to disable said engine when said PTO switch is in said engaged position and said vehicle is operating in said reverse direction when said control circuit is in said non-override condition.

5. A control circuit for controlling a power-take-off of an engine driven lawn and garden vehicle, said control circuit comprising:
   a multi-position ignition switch having at least an off position and a run position;
   a PTO switch having an engaged position and a disengaged position for selectively engaging and disengaging said power-take-off;
   a reverse switch having a forward position and a reverse position for selectively operating said vehicle in a forward or a reverse direction;
   an override switch having an activation position and a non-activation position;
   said control circuit providing a non-override condition when said ignition switch is in said run position and said override switch is in said non-activation position, said non-override condition preventing operation of said power-take-off when said vehicle is operating in said reverse direction;
   said control circuit providing an override condition when said ignition switch is in said run position and said override switch is in said activation position, said override condition allowing operation of said power-take-off when said vehicle is operating in said reverse direction;
   wherein said override condition is maintained when said vehicle transitions between said reverse and forward directions, and when said PTO switch transitions between said engaged and disengaged positions;
   wherein said override condition is released when said ignition switch is in said off position, or when said override switch is in said non-activation position; and
   wherein said override switch is a twist-and-pull magnetic switch having an electromagnetic coil for sustaining said magnetic switch in said activation position.

6. A control circuit for controlling a power-take-off of an engine driven lawn and garden vehicle, said control circuit comprising:
   a multi-position ignition switch having at least an off position and a run position;
   a PTO switch having an engaged position and a disengaged position for selectively engaging and disengaging said power-take-off;
   a reverse switch having a forward position and a reverse position for selectively operating said vehicle in a forward or a reverse direction;
   an override switch having an activation position and a non-activation position;
   said control circuit providing a non-override condition when said ignition switch is in said run position and said override switch is in said non-activation position, said non-override condition preventing operation of said power-take-off when said vehicle is operating in said reverse direction;
   said control circuit providing an override condition when said ignition switch is in said run position and said override switch is in said activation position, said override condition allowing operation of said power-take-off when said vehicle is operating in said reverse direction;
   wherein said override condition is maintained when said vehicle transitions between said reverse and forward directions, and when said PTO switch transitions between said engaged and disengaged positions;
   wherein said override condition is released when said ignition switch is in said off position, or when said override switch is in said non-activation position;
   wherein said override switch is a twist-and-pull magnetic switch having an electromagnetic coil for sustaining said magnetic switch in said activation position; and
   wherein said ignition switch is a key actuated ignition switch.

7. A method of operating a power-take-off of an engine driven lawn and garden vehicle, said method comprising the steps of:
   (a) providing a control circuit for controlling said power-take-off, said control circuit comprising a multi-position ignition switch having at least an off position and a run position, a PTO switch having an engaged position and a disengaged position for selectively engaging and disengaging said power-take-off, a reverse switch having a forward position and a reverse position for selectively operating said vehicle in a forward or a reverse direction, an override switch having an activation position and a non-activation position, said control circuit providing a non-override condition when said ignition switch is in said run position and said override switch is in said non-activation position, said non-override condition preventing operation of said power-take-off when said vehicle is operating in said reverse direction, said control circuit providing an override condition when said ignition switch is in said run position and said override switch is in said activation position, said override condition allowing operation of said power-take-off when said vehicle is operating in said reverse direction;
   (b) placing said ignition switch in said run position;
   (c) placing said reverse switch in said forward position to operate said vehicle in said forward direction;
   (d) placing said PTO switch in said engaged position to engage said power-take-off;
   (e) placing said override switch in said activation position to establish said override condition;
   (f) placing said reverse switch in said reverse position to operate said vehicle in said reverse direction;
   (g) maintaining operation of said power-take-off even though said vehicle is operating in said reverse direction;
   (h) placing said reverse switch in said forward position to operate said vehicle in said forward direction;
   (i) maintaining said override condition even though said vehicle has transitioned between said reverse and forward directions subsequent to said override condition having been established;
   (j) placing said PTO switch in said disengaged position so as to disengage said power-take-off;
   (k) maintaining said override condition even though said PTO switch has transitioned between said engaged and disengaged positions subsequent to said override condition having been established; and
   (l) disabling said override condition when said ignition switch is in said off position, or when said override switch is in said non-activation position.

8. The method as recited in claim 7, said vehicle including an electric PTO clutch connected to said PTO switch, said PTO clutch being responsive to said PTO switch for selectively engaging and disengaging said power-take-off, said control circuit further comprising means for disengaging said electric PTO clutch when said PTO switch is in said engaged position and said override switch is activated subsequent to said reverse switch being placed in said reverse position, wherein said step (e) occurs after said step (f), said step (f) further including the step of disengaging said electric PTO clutch unless said PTO switch has been switched from said engaged position to said disengaged position and then back to said engaged position.

9. The method as recited in claim 7, said method further comprising the steps of:
   providing a magneto for said engine; and
   connecting said magneto to ground so as to disable said engine when said PTO switch is in said engaged position and said vehicle is operating in said reverse direction when said control circuit is in said non-override condition.

* * * * *